No. 727,974. PATENTED MAY 12, 1903.
J. KLEIN.
ORE CLASSIFIER.
APPLICATION FILED JULY 15, 1902.
NO MODEL. 2 SHEETS—SHEET 1.

Witnesses
Alfred W Eicker
M L Drim

Inventor
John Klein
by Higdon & Longan attys

No. 727,974. PATENTED MAY 12, 1903.
J. KLEIN.
ORE CLASSIFIER.
APPLICATION FILED JULY 15, 1902.
NO MODEL. 2 SHEETS—SHEET 2.
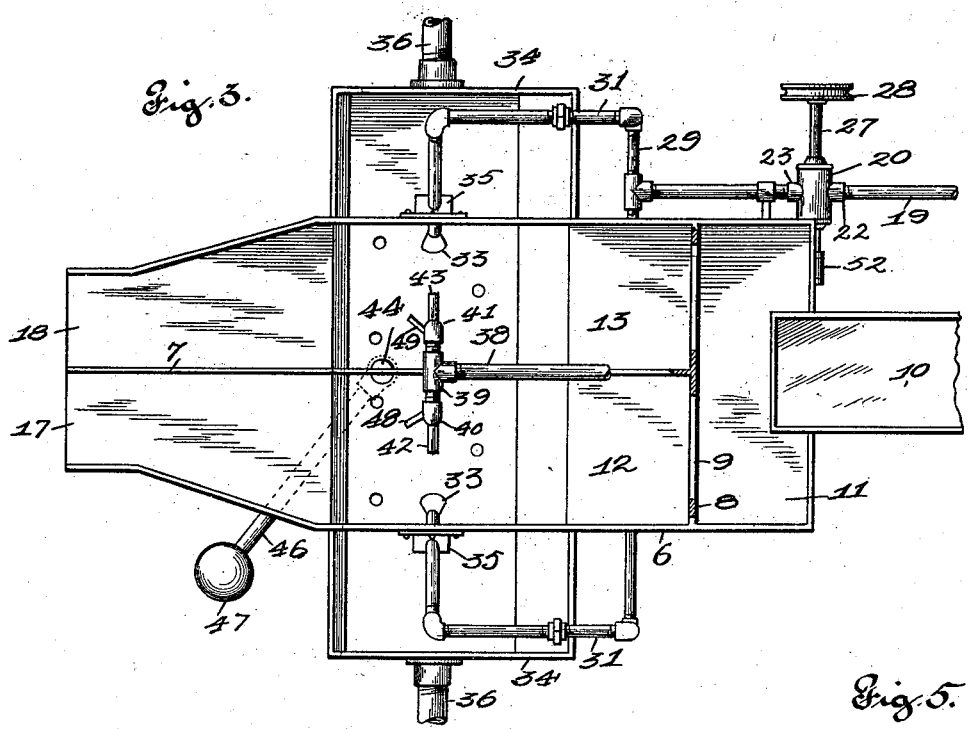
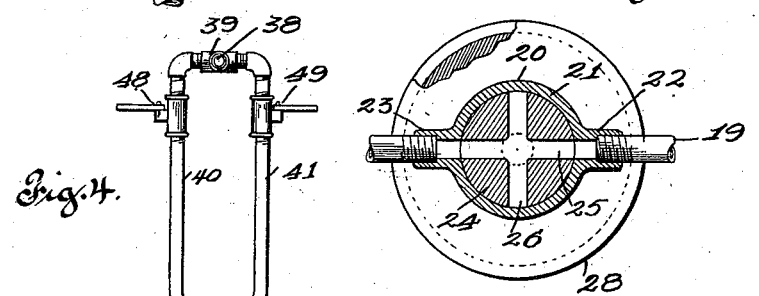
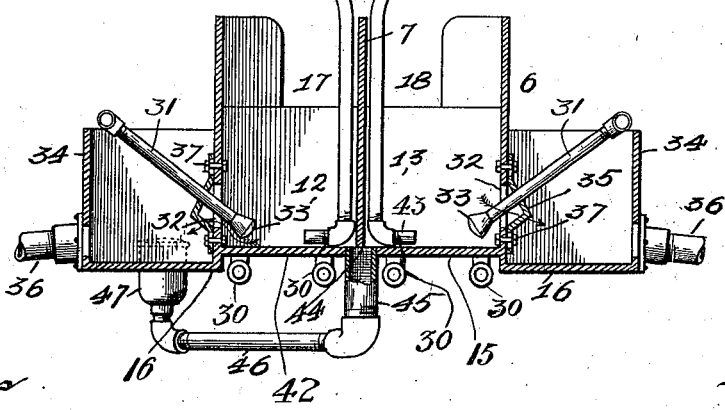
Witnesses
Alfred O. Eicks
M. L. Irwin
Inventor
John Klein
by Higdon & Longan Atty's No. 727,974.

Patented May 12, 1903.

UNITED STATES PATENT OFFICE.

JOHN KLEIN, OF DESLOGE, MISSOURI, ASSIGNOR OF ONE-FOURTH TO PAUL A. FUSZ AND CHARLES D. McLURE, OF ST. LOUIS, MISSOURI.

ORE-CLASSIFIER.

SPECIFICATION forming part of Letters Patent No. 727,974, dated May 12, 1903.

Application filed July 15, 1902. Serial No. 115,734. (No model.)

*To all whom it may concern:*

Be it known that I, JOHN KLEIN, of the city of Desloge, St. Francois county, State of Missouri, have invented certain new and useful Improvements in Ore-Classifiers, of which the following is a full, clear, and exact description, reference being had to the accompanying drawings, forming a part hereof.

My object is to construct an improved ore-classifier; and my invention consists of a hopper adapted to receive the mixture containing the ore, air-pipes discharging into the hopper, a rotary pulsating valve incorporated into the air-pipes, means of operating the valve, water-pipes discharging into the hopper, the action of the air and water serving to agitate the mixture and cause the sludge and lighter particles to be carried out through an overflow-trough, classified-ore chambers connected to the hopper to receive the ore, and an amalgam-pot connected to the hopper to receive small particles of gold.

Figure 1:
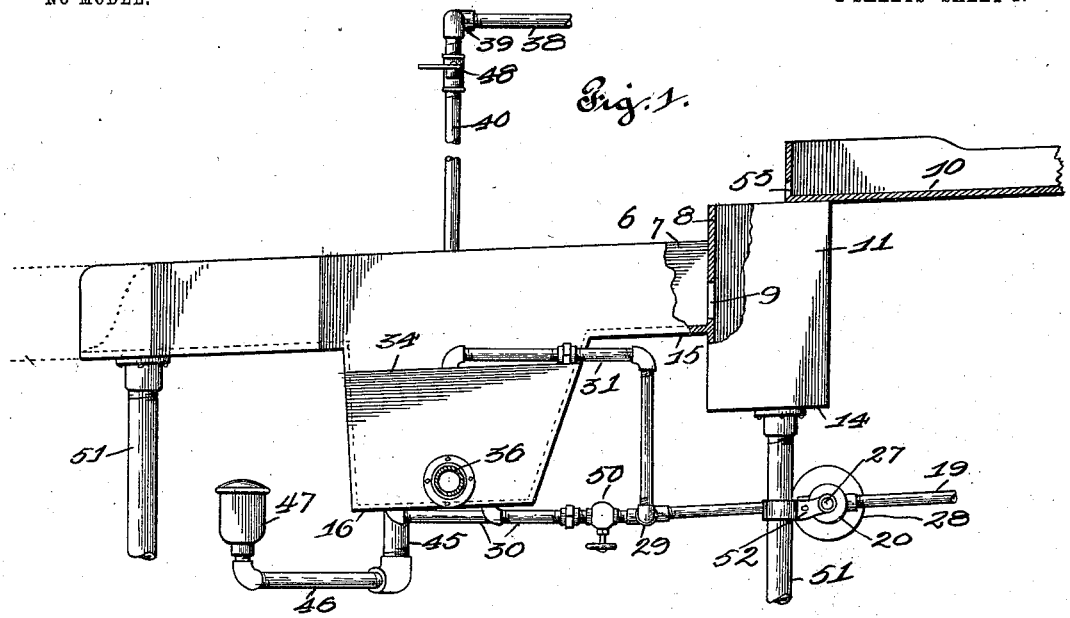
Figure 2:
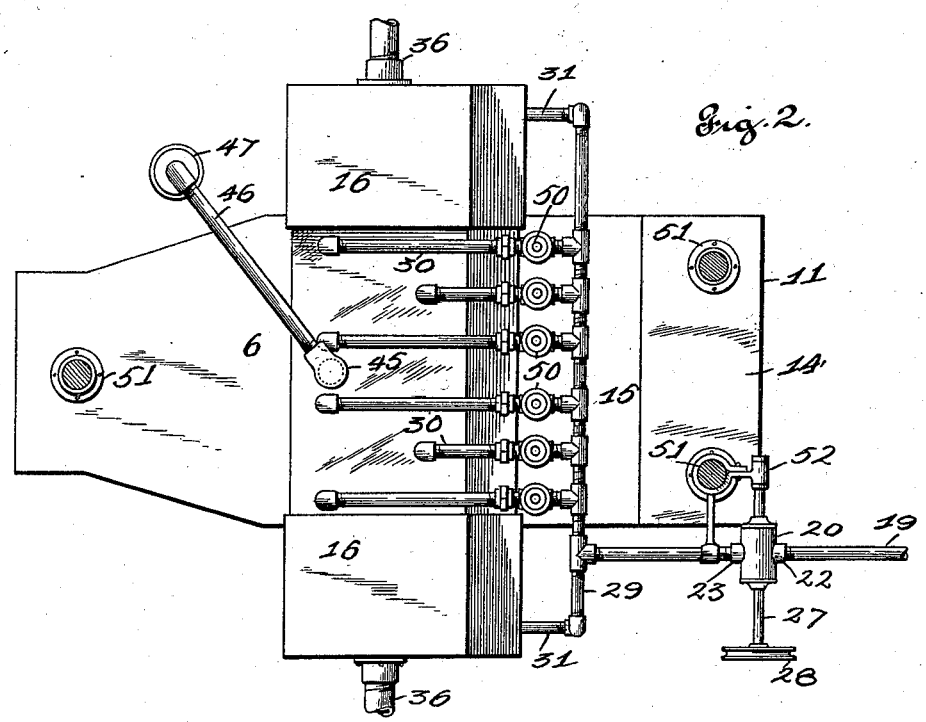

Figure 1 is a side elevation of my improved ore-classifier, parts being shown in section to illustrate the construction. Fig. 2 is a bottom plan view. Fig. 3 is a top plan view. Fig. 4 is a cross-section. Fig. 5 is a detail cross-section, upon an enlarged scale, of the pulsating valve.

Referring to the drawings in detail, the hopper 6 is divided longitudinally by the wall 7, and said hopper is transversely divided by the wall 8, there being passages 9 leading through said wall. A sluice or trough 10 discharges into the compartment 11, and the mixture passes from the compartment 11 through openings 9 to the compartments 12 and 13. The bottom 14 of the compartment 11 is considerably below the openings 9, as shown in Fig. 1, and the bottom 15, adjacent the openings 9, is considerably above the bottom 14 and also above the bottom 16, so that as the mixture of ore falls from the sluice 10 it will be churned or agitated in the compartment 11, pass through the openings 9 over the bottom 15, and fall into the main part of the hopper upon the bottom 16. After the mixture has been agitated in the compartments 12 and 13 the sludge and lighter particles will pass out through the troughs 17 and 18.

The air-pipe 19 leads from any suitable source of supply, and the pulsating valve 20 is incorporated into this air-pipe, so that the air in passing through the pipe must pass through the valve. The valve consists of a casing 21, having nipples 22 and 23 to receive the ends of the pipe, and the valve 24, rotatably mounted in the casing and having passages 25 and 26, through which the air passes. A stem 27 extends outwardly from the valve through the casing, and a pulley 28 upon the outer end of the stem may be driven by a belt or in any suitable way to continuously rotate the valve, and the rotation of the valve will alternately interrupt the passage of the air through the pipe. A cross-pipe 29 is connected to the end of the pipe 19, and branches 30 lead from the cross-pipe under the hopper and upwardly through the bottom 16. Other branches 31 lead from the ends of the cross-pipe through openings 32 in the sides of the hopper and discharge through nozzles 33 into the hopper, as shown in Figs. 3 and 4.

The classified-ore chambers 34 extend outwardly from the sides of the hopper and communicate with the compartments 12 and 13 through the openings 32. The brackets 35 are in the form of bent plates placed over the openings so as to leave an unobstructed passage at opposite edges of the brackets and have bearings in which the branches 31 are supported. The discharge-pipes 36 lead from the classified-ore receptacles 34. The brackets 35 are adjustable up and down by means of bolts 37, operating in slots in the brackets. The water-pipe 38 leads to a position above the hopper.

A T-coupling 39 is attached to the end of the water-pipe, and the branches 40 and 41 lead downwardly from the ends of the coupling, one upon each side of the partition 7, and elbows 42 and 43 are fixed upon the lower ends of said branches as required to discharge water horizontally and directly toward the nozzles 33, as shown in Fig. 4. An opening 44 is formed in the bottom of the hopper, one-half of said opening being upon each side of the partition 7. A large pipe 45 is tapped into this opening. A pipe 46 extends horizontally from the lower end of the pipe 45, and an amalgam-pot 47 extends upwardly from the outer end of the pipe 46. Amalgamating material is placed in the pot 47 and runs through the pipe 46 until the pipe 45 is filled to a level with the upper face of the bottom 16. As the ore is agitated in the hopper the fine particles of gold will be brought in contact with the amalgam in the pipe 45 and will be collected and absorbed by the amalgam and will pass through the amalgam into the pot 47, from whence it may be removed at suitable intervals as desired.

The passage of water through the branch pipes 40 and 41 is controlled by the valves 48 and 49. The passage of air through the branch air-pipes 30 is controlled by the valves 50. The entire device is supported upon the posts 51. A bearing 52, attached to one of the posts, supports the opposite end of the stem 27 from the pulley 28, as shown in Fig. 2.

The ore is ground and mixed with water and passed through the sluice or trough 10, which has a small discharge-opening 53, allowing the mixture to fall into the compartment 11, and the falling of the mixture into this compartment churns and agitates the mixture, and then it passes through the openings 9 into the main compartments of the hopper. Air passes through the air-pipe 19, through the pulsating valve 20, through the cross-pipe 29, the branch pipes 30 and 31, and is discharged by the branch pipes 30 upwardly through the bottom of the hopper and is discharged through the branch pipes 31 downwardly against the bottom of the hopper. Water is discharged from the elbows 42 and 43 directly against the nozzles 33 upon the branch pipes 31, and as the pulsating valve 20 is rotated a pulsating motion or agitation is imparted to the mixture in the hopper by the interruption of the air-pressure. The mixture is agitated and washed, the heavier particles of ore passing through the openings 32 past the edges of brackets 35 into the classified-ore chambers 34. The small particles of gold will be absorbed by the amalgam, and the sludge and refuse will pass off through the troughs 17 and 18.

The water discharged through the elbows 42 and 43 will force the heavy ore through the openings 32 into the classified-ore chambers.

The hopper, including the partitions, overflow-troughs, and classified-ore chambers, is cast in a single piece, thus rendering it devoid of cracks and joints.

I claim—

1. In an ore-classifier, a hopper, means for leading the mixture into the hopper; water-pipes leading into the hopper; overflow-troughs leading from the hopper; a plurality of air-pipes leading into the hopper; and a single rotary valve arranged with a multiplicity of radial air-passages to simultaneously interrupt the passage of air in all of said pipes, substantially as specified.

2. In an ore-classifier, a hopper, means for leading the mixture into the hopper; water-pipes leading into the hopper; overflow-troughs leading from the hopper; a plurality of air-pipes leading into the hopper; and the valve-casing 21 having nipples 22 and 23, the main air-pipe 19, connected to said nipples, a rotary valve 24 mounted in said casing and having a multiplicity of radial air-passages 25 and 26, a stem 27 extending outwardly from said valve through said casing, a pulley 28 through outer end of said stem imparting motion to said valve, said stem extending upon the opposite side of said casing, and the bearing 52 for supporting the end of said stem, substantially as specified.

In testimony whereof I affix my signature in presence of two witnesses.

JOHN KLEIN.

Witnesses:
ALFRED A. EICKS,
M. G. IRION.